(12) United States Patent
Singh et al.

(10) Patent No.: US 11,314,948 B2
(45) Date of Patent: Apr. 26, 2022

(54) SYSTEM TO CONVERT SEQUENCE OF WORDS INTO HUMAN THOUGHT REPRESENTATIONS

(71) Applicant: Medyug Technology Private Limited, Bangalore (IN)

(72) Inventors: Baljit Singh, Bengaluru (IN); Praveen Prakash, Bengaluru (IN)

(*) Notice: Subject to any disclaimer, the term of this patent is extended or adjusted under 35 U.S.C. 154(b) by 149 days.

(21) Appl. No.: 16/810,210

(22) Filed: Mar. 5, 2020

(65) Prior Publication Data

US 2020/0285813 A1 Sep. 10, 2020

(30) Foreign Application Priority Data

Mar. 5, 2019 (IN) .............................. 201941008480

(51) Int. Cl.
G06F 40/56 (2020.01)
G10L 15/187 (2013.01)
G06F 40/35 (2020.01)
G10L 15/26 (2006.01)

(52) U.S. Cl.
CPC .............. *G06F 40/56* (2020.01); *G06F 40/35* (2020.01); *G10L 15/187* (2013.01); *G10L 15/26* (2013.01)

(58) Field of Classification Search
CPC ........ G06F 40/56; G06F 40/35; G06F 40/295; G06F 40/30; G10L 15/26; G10L 15/187; G10L 15/1822
See application file for complete search history.

(56) References Cited

U.S. PATENT DOCUMENTS

| | | | |
|---|---|---|---|
| 9,230,214 B1* | 1/2016 | Joseph | G06F 40/274 |
| 2012/0166942 A1* | 6/2012 | Ramerth | G06F 40/169 |
| | | | 715/257 |
| 2014/0025367 A1* | 1/2014 | Dunko | G06F 3/0237 |
| | | | 704/9 |
| 2015/0347382 A1* | 12/2015 | Dolfing | G06F 40/284 |
| | | | 704/9 |
| 2015/0348549 A1* | 12/2015 | Giuli | G06F 3/167 |
| | | | 704/235 |
| 2017/0160813 A1* | 6/2017 | Divakaran | G06K 9/00335 |
| 2018/0089332 A1* | 3/2018 | DeLuca | G06F 16/9038 |
| 2018/0247221 A1* | 8/2018 | Park | G06F 40/20 |
| 2018/0341903 A1* | 11/2018 | Keen | G06Q 10/063118 |
| 2018/0358005 A1* | 12/2018 | Tomar | G10L 15/22 |
| 2018/0366013 A1* | 12/2018 | Arvindam | G06F 40/205 |
| 2020/0020179 A1* | 1/2020 | Advani | G10L 15/26 |

* cited by examiner

*Primary Examiner* — Fariba Sirjani
(74) *Attorney, Agent, or Firm* — Nasr Patent Law LLC; Faisal K. Abou-Nasr

(57) ABSTRACT

A system to convert sequences of words, along with concurrent non-verbal data, into thought representations, said system being used in association with a language understanding system, where words to thought transformation is needed, is disclosed. Said system comprises: an entity look-up subsystem that comprises: a pre-processing unit, a word database, and a cache; a controller or thought representation formation and reasoning unit; a multi-word entities buffer; an entity knowledge base; a predictive word meaning memory; and an output thought representation unit.

4 Claims, 2 Drawing Sheets

SYSTEM TO CONVERT SEQUENCE OF WORDS INTO HUMAN THOUGHT REPRESENTATIONS

CROSS REFERENCE TO EARLIER APPLICATIONS

The present disclosure is based on the Indian Patent Application, bearing Application Number 201941008480, dated Mar. 5, 2019.

FIELD OF THE INVENTION

The present disclosure is generally related to a system to convert sequences of words into thought representations.

BACKGROUND OF THE INVENTION

Human thought is not merely a single thought in isolation, but can mean many more thoughts; similarly, many thoughts can be expressed as a single thought. Natural Language Processing (NLP) technologies or Natural Language Understanding (NLU) technologies are currently used to understand meaning of input sentences.

However, all NLP/NLU systems available today take only well-formed sentences as input. Further, these sentences are taken only one-by-one for processing through these systems. The processing involves many tasks depending on the applications. The meanings in these systems are usually represented by an overall meaning type called intent and main entities in the intent.

For example, let us consider a sentence "Shyam has diabetes." This sentence will trigger an abstract meaning like "Patient Possesses Disease" as intent. Main items ("Patient: Shyam", "Disease: Diabetes") are the entities in this intent. However, such representations miss many aspects, like the time sense, possibility, etc. Also, the meanings are developed in isolation and mostly on a sentence-by-sentence basis. Some systems do look at previous sentences as context, but these look at sentence text and not the intent. Even if they do, they usually represent statistical importance than reasoning.

Furthermore, the current NLP/NLU systems function on the basis of written languages, which are very formal with proper grammar rules and punctuations. Thus, they do not function accurately in situations where an informal language is used (for example, the language used by an illiterate person). Unlike written language, spoken language is just a sequence of utterances of sounds, which are connected together meaningfully in groups called thoughts.

Hence, there are challenges in the current approaches as the NLP/NLU systems as on the Date of this Application use Rule-based or Neural Networks or Statistical Machine Learning algorithms for achieving the results, which require large data sets and cannot reason. The second issue with the current approaches is that the sentences are not converted to Human Thoughts. The third issue is that all these technologies function on the assumption of well-formed grammatical sentences.

There is, therefore, a need in the art for a system to convert sequences of phonetics-based words uttered by humans into thought representations that overcomes the aforementioned problems and drawbacks.

SUMMARY OF THE INVENTION

A system to convert sequences of words, along with concurrent non-verbal data, into thought representations, said system being used in association with a language understanding system, where words to thought transformation is needed, is disclosed. Said system comprises: an entity look-up subsystem, a controller or thought representation (TR) formation and reasoning unit, a multi-word entities buffer, an entity knowledge base, a predictive word meaning memory, and an output thought representation unit.

The entity look-up subsystem (ELUPS) facilitates the looking up of an input word sequence by a controller, for populating a multi-word entities buffer with its output. The ELUPS comprises: a pre-processing unit that checks the incoming word sequence for known entities, a word database that stores a list of words that belongs to a particular language, and a cache that facilitates the storing of each valid concept, along with a unique identifier and semantic type.

The multi-words entities buffer is the working memory of the system that stores multi-word entities while the system transforms words into thoughts.

The entity knowledge base stores knowledge about various entities, which are usually represented by a word or multiple words together. Said entity knowledge base represents all entities and the relation between them, and helps the ELUPS in forming of multi-word entities. Said entity knowledge base comprises at least two main first data stores, such as an entity semantic network, and an entity names knowledge base.

The predictive word meaning memory is configured to imitate a human brain, which can predict what could come next. Said memory holds sequences of input words since the last completion of a thought representation and outputs: next expected words or concept type, based on the sequence of previous words and thought representations, for the sequence of input words.

The controller monitors and co-ordinates all the activities within the system. Said controller takes the sequence of input words, along with metadata and concurrent non-verbal data as inputs, and outputs all the possible and meaningful TRs, which are stored on an output thought representation unit. The controller: receives at least one feedback from a main controller of a language understanding system to decide whether to process further or to stop processing, and sends a status signal to the main controller of the language understanding system during a current task or after the completion of the task.

DESCRIPTION OF THE INVENTION

Throughout this specification, the use of the word "comprise" and "include", and variations such as "comprises", "comprising", "includes", and "including" may imply the inclusion of an element or elements not specifically recited.

Throughout the specification, the use of the phrase 'thought representation', 'TR', and their variations are used in the meaning of a language-independent representation of human thoughts.

Throughout the specification, the phrase 'phonetics-based word', 'PBW', and their variations are used to denote spoken language words, regardless of spelling. For example "there" and "their" are examples of a phonetics-based words which are spelt differently, but have the same phonetics. The representation of PBW is based on language-independent phonemes and may be inspired by IPA (International Phonetic Alphabets) standards, but may also use any other language-independent phonetic standards.

Throughout the specification, the phrase 'word', 'input word', and their variations are used to denote PBWs or Spelled Words.

Throughout the specification, the phrase 'entities or concepts', and its variations, are used to denote concepts, which either represent an object or action (physical, behavioral, or mental) performed by these objects. For example "Diabetes" is a concept and "Running" is another concept.

Figure 1:
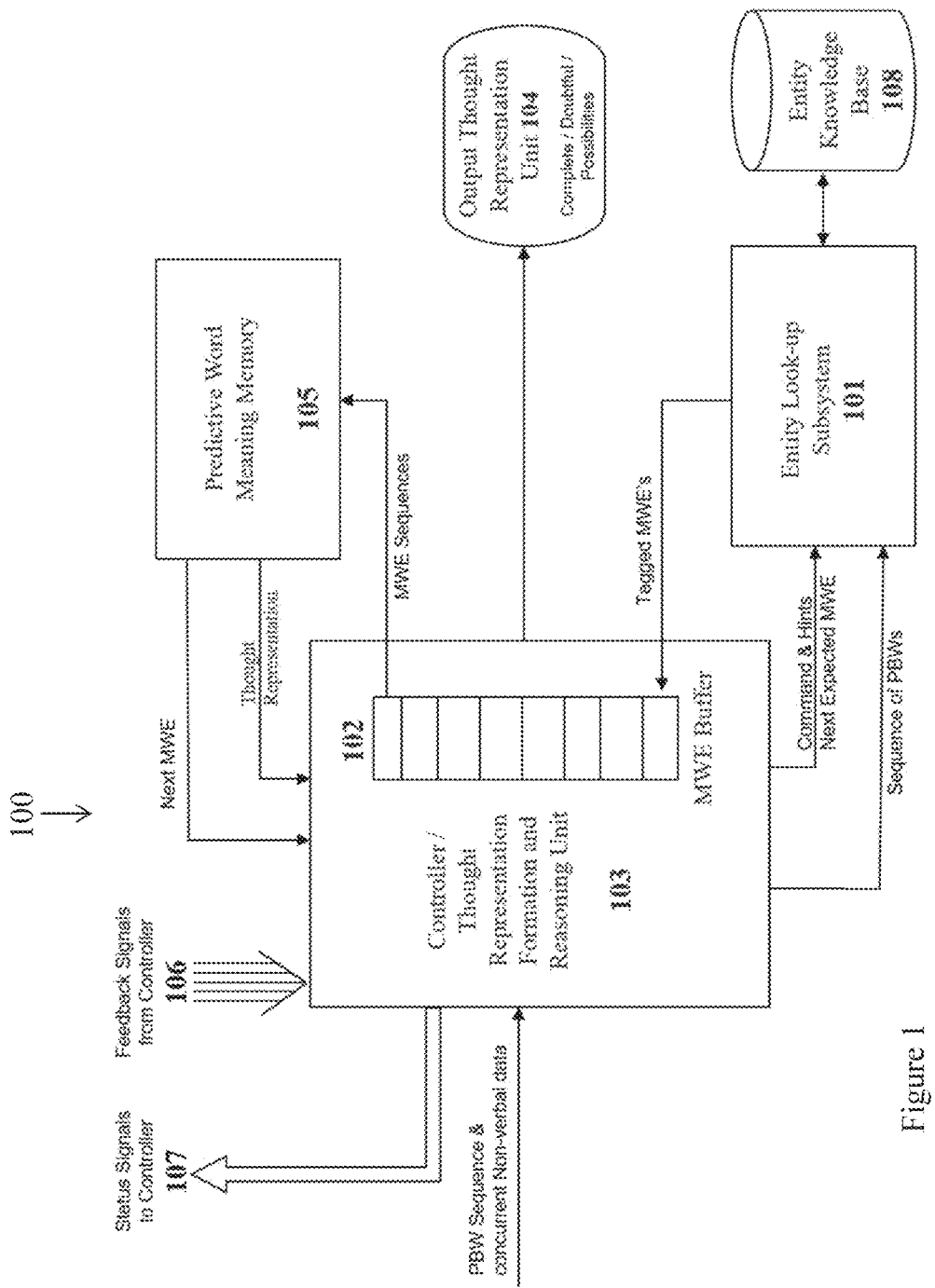
FIG. 1 illustrates an embodiment of a system to convert sequences of words into thought representations, in accordance with the present disclosure.

A system to convert sequences of words, along with concurrent non-verbal data, into thought representations is disclosed. As illustrated in FIG. 1, an embodiment of the system (100) comprises: a controller or thought representation formation and reasoning unit (103), an entity look-up subsystem (101), a multi-word entities buffer (102), a predictive word meaning memory (105), an entity knowledge base (108), and an output thought representation unit (104).

The entity knowledge base (108) stores knowledge about various entities which are usually represented by a word or multiple words together, like: "Shyam", "Play", "Football", "Beautiful", "Diabetes Type 2", etc. The entities may be of following role-types:

1. Named Entities or Nouns, like "Shyam", "Diabetes Type 2", "Football", "New York", etc.;
2. Actions or Verbs, like "Play", "Run", "Think", etc.;
3. Describers or Adjectives, like "Beautiful", "Good", "Tall", etc.

Figure 2:
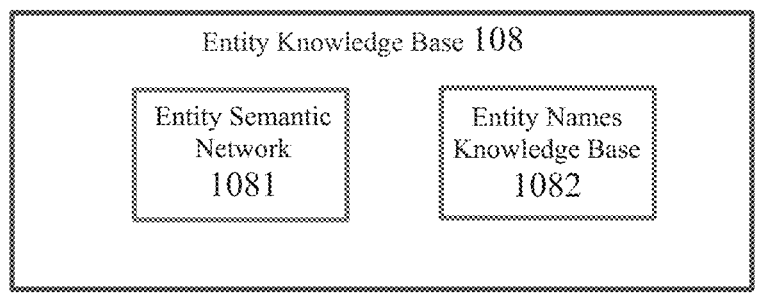
FIG. 2 illustrates an embodiment of an entity knowledge base of a system to convert sequences of words into thought representations, in accordance with the present disclosure.
Figure 3:
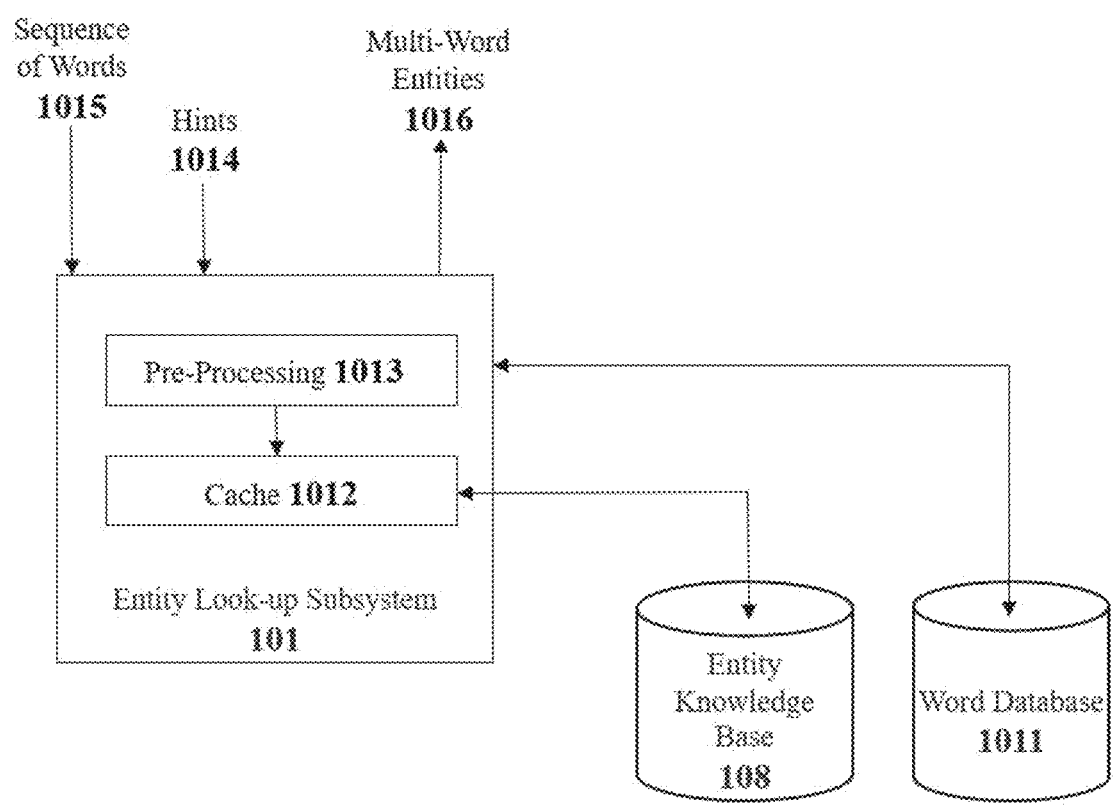
FIG. 3 illustrates an embodiment of an entity look-up subsystem of a system to convert sequences of words into thought representations, in accordance with the present disclosure.

The entity knowledge base (108) represents all entities and the relation between them, thus representing knowledge about them. This knowledge base (108) is usually specific to a domain with some extra worldly knowledge associated with a domain. The entity knowledge base (108) can store spelled words or PBWs depending on the system configuration. As illustrated in FIG. 2, the entity knowledge base (108) may have at least two main data stores:

An entity semantic network (1081): This data store comprises all types of entities involved in the entity knowledge base (108). Entity types can be hierarchically arranged. Examples of entity types are "Organisms", "Animals", "Humans", "Diseases", "Symptoms", "Physical Activity," etc. This is a small network spanning about a few hundred entities. This data store may also comprise the types of relationships, which may occur between actual entities (for example, "diagnoses", "results in", "indicates", etc.).

An entity names knowledge base (1082): This data store contains the actual names of entities for each type defined in the entity semantic network (1081) data store. These entities are then connected to each other through relations. Examples of the entity name are "Diabetes Type 2", "Headache", "Playing", "Crocin", etc. These entities also become linked together using specific relations like "may treat" to connect medicine names to diseases. The relations and entity names can be vast knowledge or limited knowledge based on how much information handling is required.

The controller or thought representation formation and reasoning unit (103) is a central block of the system (100), and said controller (103) monitors and co-ordinates all the activities within the system (100). The controller (103) takes sequence of input words (PBWs or Spelled Words), along with metadata, such as timestamp, and concurrent non-verbal data including, but not limited to, speaker-ID, speaker-change-notifier, visual-clues, voice-inflection, and processed sensor-data, as inputs, and outputs all the possible and meaningful TRs. The output TR may be complete or it may capture ambiguities by providing multiple alternatives. The output TR can also carry relevant non-verbal data and other metadata as needed. The key functionalities of the controller (103) are:

Reasoning: This unit (103) reasons the sequence of input words with all possible sequences of entities obtained till now since the last complete TR and tries to come up with the best possible and meaningful TR. This unit (103) also connects two thoughts together with suitable words such as "while", "because", etc.

Contextual completion: Some sentences may be single-word answers to questions. These single-word answers represent full thoughts, which will be completed in this unit (103). For example: for a question "what is capital of India", the answer is "Delhi". But "Delhi" word actually means "Delhi is the capital of India." This completion will be done by this unit (103). There may be other such contextual completions needed for other types of sentences (for example, "While running, he got pain" actually means "While he was running, he got pain").

Contextual dereferencing: Consider an example of sentences: "Ram played football. He was happy." Here, "He" word points to "Ram", and needs to be dereferenced, which happens in this unit (103).

Interaction with a controller of a language understanding system: This unit (103) receives at least a feedback (106) from a main controller of a language understanding system to decide whether to process further or stop processing and sends status signal (107) to the main controller of the language understanding system during the current task or after the completion of the task.

The controller (103) looks up the input word sequence (1015) in the entity look-up subsystem (ELUPS) (101) and populates the multi-word entities buffer (102) with the output of ELUPS (101). The output of ELUPS (101) is multi-word entities. The controller (103) may pass at least a hint (1014), along with the input word sequence (1015), to prioritize the look-up based on semantic-type of similar words. For example, the at least a hint (1014) may indicate the next expected concept is a disease, thereby helping the ELUPS (101) to restrict its look-up for the next word in the entity knowledge base (108) to all disease names only.

The ELUPS (101) comprises: a pre-processing unit (1013) that checks the incoming word sequence for known entities, a word database (1011) that stores a list of words that belongs to a particular language, and a cache (1012) that facilitates the storing of each valid concept, along with a unique identifier and semantic type.

The pre-processing unit (1013) checks the incoming word sequence for known entities to identify, including, but not limited to: day/date/time items (e.g. 14 Nov. 2015); relative date/time items (e.g. 2 hours ago, 10 days later); numeric quantities with any units specified (e.g. 75 kg, 100 ml, 34 years); and person-names from contextual information or from a database of general, common names.

After pre-processing the words are looked-up in the entity knowledge base (108) and in the word database (1011). From the word database (1011), the following information is fetched:

The words are looked-up and tagged with word-inflection, root-word, and role-type. For example "running" has the root word "run", role-type of verb, and inflection of present-continuous tense.

The words are also tagged with Most Frequent Words (MFW) class indicating them as belonging to one of the frequent-vocabulary classes (e.g. most frequently used articles, prepositions, adjectives, body-parts, action-verbs, etc.).

Further, the group of words are looked-up in the entity knowledge base (108) to form multi-word entities (1016). Before going on to the entity knowledge base (108), the cache (1012) is looked-up first while forming the multi-word entities (1016). The cache (1012) helps to speed up the process. The cache (1012) is populated with the following concepts:

Frequently and recently identified concepts—validated by modules outside the system (100);

Entities from TRs that are closely related to previously generated TRs are cached. For example, if a TR is about headache, a closely related thought could be about (a) description of headache and (b) medications used. From (a), the entities could be "throbbing headache", "migraine", "lack of sleep", etc., while (b) could have entities that are medicines used to treat or relieve headache.

Other entities may also frequently co-occur. For example, in medical literature, with the keyword "migraine", there may be related concepts about treatments, procedures, causes, demographics, etc. These statistically co-occurring concepts are cached.

Multi-word entities (MWE) are a special representation, which represent the entities with special attributes. An entity can be formed by multiple words, like "Diabetes type 2", which has three words that form a single entity. That is the multi-word aspect of MWE. The other important features of MWE are some important metadata or attributes to represent the meaning of that entity. These attributes are given below, but are not limited to these, and can be enhanced to enrich TR formation:

Concept ID or Entity ID: This is a unique ID given to an entity from the entity knowledge base (108) that will represent the actual meaning of the specific sequence of words.

Semantic Type: This is again a unique meaning or semantic type of that entity from the entity semantic network (1081). For example, "Diabetes Type 2" entity may be given a semantic type as "Disease", represented by a unique ID or other representation.

Word Sequence: List of input words that was interpreted as MWE.

Word Inflection Details: Marking of important inflections, like time sense, using "ing" for present-continuous action, or "ed" for past tense. Similarly other inflections like: plurality or negations, "Un" or "dis" prefix, "ness" or "less" suffix, etc. may also be marked Along with inflection type, the root word is also stored.

Specific type of Most Frequent Words: Any language has a small set of words in its vocabulary that have a significantly high frequency of usage. Our studies on various corpuses have shown that less than 1,000 words account for up to 75% frequency of words in a text corpus. We partition these MFWs into specific types, like pronouns, verbs, most frequent actions, etc. This partitioning can be changed as per requirement Role-Type: This is like Part of Speech (POS) tags of MWEs indicating the role of the MWE in sentence. We propose role-types as Object, Action, Describer, or Connector. However, this can be expanded or replaced with other role-types, like usual English Part of Speech Tags (Noun, Pronoun, Verb, Adjective, Articles, etc.).

The reason behind the MWE is to make the entity-information richer with more information specific to a language to ease meaning formation. Also, it is not mandatory to have all attributes specified for MWE. Each MWE needs to have at least one of the attributes explained above.

The multi-words entities buffer (102) is the working memory of the system (100) that stores the MWEs while the system (100) transforms words into thoughts. The multi-words entities buffer (102) facilitates the storing of all the multi-words entities (1016) which are output by the ELUPS (101).

MWEs are made up of multiple words. Different MWEs may come from different grouping of words, substitutions, transitory incompleteness due to streaming-input, etc. For example, "Diabetes Type 2" is a concept and so is its substring "Diabetes." All possibilities need to be mapped. The words and entities may be grouped differently during TR construction. For example, for an input sequence of "Patient has fever and headache still persists . . . " there can be possible TR-sequence as ["Patient has fever and headache", "still persists . . . "] or an alternate interpretation as ["Patient has fever", "and", "headache still persists . . . "].

When stored as a Graph, graph-traversal enumerates all of the possibilities. MWEs for all possible groupings on input words are saved in a graph structure, but not all paths in the graph may be taken. The controller (103) chooses the most probable path first. Based on the feedback on output TR, alternative paths may be explored by the controller (103). The multi-words entities buffer (102) is the storage for this graph.

The predictive word meaning memory (105) holds sequences of input words since the last completion of a thought representation and outputs: next expected words or concept type, based on the sequence of previous words and thought representations, for the sequence of input words. This memory (105) is configured to imitate a human brain, which can predict what could come next. For example, when someone says "I am going to", the human brain can predict what words or types of words could possibly come next. These are stored as memories in the human brain. The predictive word meaning memory (105) can also work like the human brain in such situations. This memory (105) is a special custom memory, which, for a given input sequence, can predict the next output with many other attributes related to the input. The predictive word meaning memory (105) can also predict the next expected MWE, which is forwarded by the Controller (103) to ELUPS (101) as the at least one hint (1014) along with next sequence of input words, for better performance and accuracy.

The key functionalities of the predictive word meaning memory (105) are:
1. Provides what would be the next predicted MWE for a given sequence of MWEs. For example, given MWE equivalents of English words "My name is", it is known that a human name will be the next. So, the semantic type in the predicted MWE is already known. Similarly assume other utterances "I am travelling to new", it is known that the next word could be a place, given our limited dictionary ("Delhi", "York", etc. . . . ).
2. Provides possible TR formations for each predicted next MWE in #1 above.

3. For a given sequence of MWEs, this memory (105) gives the possible TR representation, which can be formed. Representation of these partial TRs should meet the specifications mentioned above. The memory (105) supports:
   a. Fully specified TRs, with all components of TRs fully specified, like type of TR, the specific entities tagged to specific roles in a thought-type, Inflections on TR, like time sense, etc.
   b. Partial TRs, with only type of TR known; however, entities are not resolved as they are not in the entity knowledge base (108) and, hence, are not relevant or the system (100) is yet to learn those.
   c. Doubtful entity resolution in TR, where a word may mean multiple things and is not successfully resolved.
   d. Multiple TRs possibility for a sequence of words.
4. May take context with sequence of MWE in some form. This context may either be stored internally on the memory (105), or may be available from the master controller outside the system (100).

Differentially Prioritized Access: The predictive word meaning memory (105) should have property to prioritized access to certain output than other, based on recency and frequency of the item used. Phonemes sequence will always point to a single valid PBW because PBWs are not based on spelling, but how words are pronounced. But humans have different dialects and often deviate from ideal pronunciation. When this happens, there could be different possible outputs which are most probable. For example, assume a person pronounces "bed" English word as ("b", "a", "d") due to varied dialect. In this case, the output could be the perfect match as "bad", but will also output possible other best matches like "bat", "bed", etc. Now, these different options will be given different probabilities, which will be based on most recent and most frequent best success for this particular use. The differential prioritized access increases probability of certain items, which were used most recently or very frequently in past. This concept can be coded in various mathematical models to arrive at the probabilities.

The output thought representation unit (104) comprises the output from the system (100). The output TRs may be: complete, doubtful, and/or multiple possible TRs for disambiguation in future. There are two types of TRs which will be sent forward: Confirmed TR or Check TR. Check TR is to check the feasibility of TR before confirming it.

The system (100) takes sequences of input words as input and outputs meaningful thought representations (TR). Usually, this system (100) is used after a system which creates PBWs from voice signal. Alternatively, the preceding system can be a simple speech-to-text system that outputs spelled words. The system (100) is intended to be used in a language understanding system, where spoken language is transformed into thoughts. The TR output from the present system (100) may have certain important properties called thought-inflectors, which include, but are not limited to, the following:
   1. TR should capture time sense of a sentence. For example, there is difference between "Shyam went to Paris" vs "Shyam is in Paris" vs "Shyam will go to Paris". All three sentences represent different time senses of the TR. The TR could represent a past, present, or future sense;
   2. TR should capture possibility sense of a sentence. For example there is a difference between sentences "Shyam will go to School" and "Shyam may go to School";
   3. TR should capture capability sense of a sentence. For example "Shyam will win" vs "Shyam can win";
   4. Similarly, negation (NOT sense), question sense, etc., are also captured in the TR;
   5. Each TR representation can have high resolution or low resolution representation. High resolution TR has full details of thoughts. Low resolution TR just represents the broader act described in a TR; and
   6. Each TR has a broader context.

In an embodiment of the present disclosure, the system (100) may be implemented in at least one computing system, in association with a language understanding system or any other system that provides required input to the present system (100). The computing system may work on a networked environment. The network may be the Internet, a virtual private network, a local area network, a wide area network, a broadband digital network, or any other appropriate structure for enabling communication between two or more nodes or locations. The network may include a shared, public, or private data network. Further, the network may encompass a wide area or local area, and may include at least one wired and/or wireless connections.

In another embodiment of the present disclosure, the at least one computing system may include, but is not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Throughout the specification, the system (100) does not use the actual phonetic form of PBWs, rather it uses plain English spelling to represent PBWs. It is easy to convert English words into PBWs. For example, the word test is represented as "tɛst". Similarly, the word "done" is represented as "dˆn". The system (100) uses International Phonetic Alphabets (IPA) phonetic standards to represent phonetics-based representation of words. Alternatively, the system (100) uses conventionally spelled words, such as an output from a Speech Recognition system.

It will be apparent to a person skilled in the art that the above description is for illustrative purposes only and should not be considered as limiting. Various modifications, additions, alterations and improvements without deviating from the spirit and the scope of the disclosure may be made by a person skilled in the art. Such modifications, additions, alterations and improvements should be construed as being within the scope of this disclosure.

LIST OF REFERENCE NUMERALS

100—A System to Convert Sequences of Words into Thought Representations
101—Entity Look-Up Subsystem
1011—Word Database
1012—Cache
1013—Pre-Processing Unit
1014—At Least One Hint
1015—Word Sequence
1016—Multi-Word Entities
102—Multi-Word Entities Buffer 103—Controller/Thought Representation Formation and Reasoning Unit
104—Output Thought Representation Unit
105—Predictive Word Meaning Memory
106—At Least a Feedback from a Main Controller of a Language Understanding System
107—Status Signal to the Main Controller of the Language Understanding System
108—Entity Knowledge Base
1081—Entity Semantic Network
1082—Entity Names Knowledge Base

We claim:

1. A system to convert sequences of words, along with concurrent non-verbal data, into thought representations, said system being used in association with a language understanding system, where words to thought transformation is needed, comprising: an entity look-up subsystem that facilitates the looking up of an input word sequence by a controller, for populating a multi-word entities buffer with its output; the multi-words entities buffer that is the working memory of the system, said multi-word entities buffer storing multi-word entities while the system transforms words into thoughts; an entity knowledge base that stores knowledge about various entities, which are represented by a word or multiple words together, said entity knowledge base: representing all entities and the relation between them, helping the entity look-up subsystem form multi-word entities, and comprising at least two main data stores; a predictive word meaning memory that holds sequences of input words since the last completion of a thought representation, and outputs: next expected words or concept type, based on the sequence of previous words and thought representations, for the sequence of input words; and the controller, which monitors and co-ordinates all the activities within the system, said controller taking the sequence of input words, along with metadata and concurrent non-verbal data as inputs, and outputting all the possible and meaningful thought representations, which are stored on an output thought representation unit, with the controller: receiving at least one feedback from a main controller of a language understanding system to decide whether to process further or to stop processing, and sending a status signal to the main controller of the language understanding system during a current task or after the completion of the task.

2. The system of claim 1, wherein the entity look-up subsystem comprises: a pre-processing unit that checks the incoming word sequence for known entities, a word database that stores a list of words that belongs to a particular language, and a cache that facilitates the storing of each valid concept, along with a unique identifier and semantic type.

3. The system of claim 1, wherein the at least two main data stores include an entity semantic network, and an entity names knowledge base.

4. The system of claim 1, wherein the system uses International Phonetic Alphabets phonetic standards or an output from a Speech Recognition system.

* * * * *